United States Patent [19]

Schmidt et al.

[11] Patent Number: 4,769,335

[45] Date of Patent: Sep. 6, 1988

[54] METHOD AND APPARATUS FOR TRANSPORTING PHOTOSENSITIVE FLUIDS

[75] Inventors: F. Walter Schmidt, Oakville; Allen H. Chan, Hamilton; Warren E. Baker, Islington, all of Canada

[73] Assignee: NCS Diagnostics Inc., Mississauga, Canada

[21] Appl. No.: 803,281

[22] Filed: Dec. 2, 1985

[51] Int. Cl.⁴ .................. G01N 1/00; G01N 21/01
[52] U.S. Cl. ............................. 436/176; 422/41; 422/42; 422/102; 206/524.1; 206/524.3; 206/524.6
[58] Field of Search .................. 422/40–42, 422/102; 436/176; 206/316, 459, 524.1, 524.3, 524.6

[56] References Cited

U.S. PATENT DOCUMENTS

| | | | |
|---|---|---|---|
| 3,607,098 | 9/1971 | Strande | 422/102 |
| 4,015,131 | 3/1977 | McDonough et al. | 250/461 R |
| 4,250,078 | 2/1981 | McFarlane et al. | 525/444 X |
| 4,327,127 | 4/1982 | Dapp et al. | 427/146 |
| 4,587,200 | 5/1986 | Tamoto et al. | 430/281 |

Primary Examiner—Barry S. Richman
Assistant Examiner—Lynn M. Kummert
Attorney, Agent, or Firm—Moss, Hammond

[57] ABSTRACT

A container body is formed of a polymer material and contains coloring matter effective to render the body substantially opaque to electromagnetic radiation having a wave length of about 5 to about 600 nm and translucent or semi-transparent to electromagnetic radiation having a wave length of about 600 to about 800 nm. The container permits storage and transport of photosensitive fluids, for example, body fluids for test purposes which contain bilirubin and other photo-degradable substances, but at the same time the contents of the container body are apparent from visual inspection.

9 Claims, 4 Drawing Sheets

METHOD AND APPARATUS FOR TRANSPORTING PHOTOSENSITIVE FLUIDS

BACKGROUND OF THE INVENTION (i) Field of the Invention

This invention is concerned with the storage and transport of photo-sensitive fluids, especially biological fluids. In particular, the invention is concerned with a container for the storage, protection and transport of such fluids, a method of storing and transporting such fluids and an improved diagnostic method.

(ii) Description of Prior Art

Analytical tests play an important role in food and medicinal chemistry. In the field of medicine such tests are used both in diagnosis and prognosis of disease and are being used increasingly in routine medical examinations.

Analytical tests for diagnosis and prognosis of disease are more generally referred to as diagnostic tests. Such tests involve obtaining samples of body fluids, for example, blood or urine, from a patient, and subjecting the samples to analytical tests for the presence of abnormal components, the absence of normal components or of an excess of normal components, any of which may be indicative of disease or the onset of disease.

The analytical testing is frequently carried out at a location and time remote from those at which the samples are taken.

One difficulty with tests of this type is the possible presence in the sample, at the time of testing, of materials which interfere with the test or distort the test results. Such interfering or disturbing materials may produce a false positive or negative finding.

Another difficulty is that the substances in the sample which are to be tested for may degrade between the time that the sample is taken and the time of the analytical test. One cause of such degradation is exposure to electromagnetic radiation or light.

In order to avoid this problem it has been common practice to store the samples in opaque containers up to the time of testing.

In this way degradation of substances to be tested for may be minimized.

A disadvantage of this practice is that the contents of the container can not be viewed without opening the container. Thus, whether or not a container contains a fluid sample is not apparent from a visual inspection. Opening the container prior to the analytical testing does, of course, expose the fluid contents to electromagnetic radiation which may be sufficient to initiate degradation of substances in the fluid.

It is an object of this invention to overcome problems associated with conventional containers.

It is another object of this invention to provide an improved method for storing and transporting photosensitive fluids.

It is still another object of this invention to provide an improvement in diagnostic methods.

SUMMARY OF THE INVENTION

In accordance with the invention there is provided a container for storage and transportation of photo-sensitive fluids. The container has a container body formed of polymer material which contains colouring matter. The colouring matter is selected so as to render the container body substantially opaque to electromagnetic radiation having a wave length of about 200 to about 600 nm, and translucent to electromagnetic radiation having a wave length of about 600 to about 800 nm.

There is also provided, in accordance with the invention, a composition for forming the container body and a method of storing photosensitive fluids.

In particular the use of colouring matter which prevents any significant transmission of ultraviolet light and light in the visible spectrum having a wave length below 600 nm prevents degradation of many substances found in body fluids, including bilirubin, ceruloplasmin, creatine phosphokinase, Vitamin A, carotene and folic acid which substances are photo-sensitive.

On the other hand, the colouring matter is also selected to permit transmission of some light in the visible spectrum so as to be semi-transparent or translucent, whereby the interior of the container body may be viewed by visual inspection of the body, without the necessity of opening the container.

The polymer material is one which, in the absence of the colouring matter, will form a clear body, transparent to ultraviolet radiation and light in the visible spectrum.

DESCRIPTION OF PREFERRED EMBODIMENTS (i) Polymer Material

Any polymer material meeting the basic requirements for forming an essentially clear transparent container body may be employed.

Suitably the polymer material is moldable to form a hard, self-supporting body of rigid, durable, impact and heat resistant structure. The polymer material should be substantially inert to the environment in which it is to be used. Clearly the polymer material should be inert to the photosensitive fluids which it is to house.

The polymer material should not readily discolour or stain and should be susceptible to being molded with colouring matter of an inorganic or organic nature, and should withstand temperature extremes without cracking.

The polymer may be a homopolymer or copolymer or mixtures thereof or a high molecular weight condensation product.

An especially suitable polymer material is polystyrene especially clear or crystal polystyrene, for example, that marketed under the trade mark Styron 667, by Dow Chemical Canada.

The colouring matter may be inorganic or organic in nature and may be a pigment or dye.

(ii) Colouring Matter

The colouring matter should be dispersible in the polymer material so as to uniformly colour the resulting container body to produce an acceptable appearance. The colouring matter should be stable at the elevated temperatures encountered in the processing of the polymer material to form the container body. Also, the colouring matter should be inert to the photosensitive fluids housed in the container.

The colouring matter may be composed of a mixture of two or more pigments or dyes which together provide the required characteristics of blocking certain ranges of electromagnetic radiation and being transparent or translucent to others.

In practice of the invention it is not essential that the colouring matter render the container body completely opaque within the range of about 200 to about 600 nm, and some transmission in short ranges within this range may be permissible.

For the purposes of the invention transmission in short ranges spanning up to 100 nm within the range of 200 to about 550 nm should not exceed 20%, preferably not exceed 15% and most preferably not exceed 10%.

It will be understood that different components of photo-sensitive fluids are degradable at different wave lengths of electromagnetic radiation. Limited transmission of electromagnetic radiation at wave lengths which do not significantly affect components under consideration in the fluid is not detrimental.

By way of example, the most significant degradation of bilirubin occurs on exposure to electromagnetic radiation in the range of 400 to 600 nm which is within the visible spectrum, and there is significantly less degradation on exposure to electromagnetic radiation in the ultra-violet region below 400 nm, especially below 370 nm.

Ceruloplasmin, on the other hand, degrades on exposure to ultra-violet radiation having a wave length of about 254 nm. Clearly some limited transmission of electromagnetic radiation in a short range of wave length between 254 nm and 370 nm will not affect bilirubin and ceruloplasmin to any significant extent and thus will not affect analysis results concerning these two components of biological fluids.

Other test components such as Vitamin A, carotene and folic acid are likewise sensitive to electromagnetic radiation in the ultra-violet region. Creatine phosphokinase is sensitive to blue light in the visible spectrum around 390 to 400 nm.

An especially preferred class of colouring matter is that which produces an amber colouration in the container body.

Inorganic pigments which produce an amber colouration include blends of iron oxides. For example, an amber colouration is produced by a blend comprising a red iron oxide pigment with a small amount typically 10 to 15%, by weight, of the blend, of black iron oxide pigment.

Red iron oxide, also known as brown iron oxide is reddish-brown in colour; it is not a true iron oxide but contains ferric carbonate, ferric hydroxide and ferrous hydroxide and is used as a paint pigment. One suitable red iron oxide is that available from Hilton Davis (U.S.A.) under the trade mark Microspin Red, which is in a micronized powder form and has a colour index No. 77491.

Black iron oxide is blue-black in colour and contains ferrous oxide, ferric oxide and ferriferrous oxide. One suitable black iron oxide is that available from Hilton Davis (U.S.A.), under the trade mark Transoxide Black, which is also in a micronized powder form and has a colour index No. 77499.

Blends of organic dyes having blue, red and yellow colourations are found to be useful in forming an amber colouration. Such dyes include, in particular, polycyclic compounds, for example, anthraquinone and perinone derivatives which are soluble or dispersible in solvents. For example, an amber colouration is produced by a blend of blue, red and yellow organic dyes of this type available from Hoechst Canada under the trade marks Solvoperm Blue B, Solvoperm Red G and Solvoperm Yellow G. For example, an amber colouration is obtained from a blend comprising 10 to 30%, by weight, of Solvoperm Blue B and 35 to 45%, by weight, of each of Solvoperm Red G and Solvoperm Yellow G to a total of 100%, more especially a blend comprising 20% of the Blue B and 40% of each of the Red G and Yellow G, by weight, provides good results.

Organic dyes, such as those of the Solvoperm series can be more particularly characterized by reference to their Colour Index. The Colour Index is an International Classification established by the Society of Dyers and Colourists of Great Britain and the American Association of Textile Chemists and Colourists. The characterizing Colour Indices of the three Solvoperm dyes is set out hereinafter in Table I.

TABLE I

| Dye | Colour Index |
| --- | --- |
| Solvoperm Blue B | Solvent Violet 13 |
| Solvoperm Red G | Solvent Red 135 |
| Solvoperm Yellow G | Disperse Yellow 64 |

(iii) Container

The container conveniently includes a container body in accordance with the invention and a container lid. The invention is not concerned with the mechanical structure of the container which may be conventional.

A typical container body will include a generally cylindrical wall terminating at a base end in a disc-shaped floor and being open at a rim end. A structure such as a thread is provided at the rim end for secure engagement with the lid.

The lid is suitably pigmented to render it substantially opaque to electromagnetic radiation having a wave length in the range of about 200 to about 800 nm. Thus the lid would be opaque to both ultra-violet and visible light. Conveniently the lid may be molded from low density polyethylene pigmented with a white pigment, for example, titanium dioxide.

The lid could be manufactured from the formulation employed in the container body but this is not necessary.

The polymer material of the container body typically will contain from 0.010 to 0.5%, preferably 0.05 to 0.25%, by weight, of the colouring matter, the remainder being polymer material.

The wall thickness of the container is suitably from 0.5 cm to 0.25 cm, and preferably about 0.1 cm to about 0.15 cm.

BRIEF DESCRIPTION OF THE DRAWINGS

The invention is further illustrated by reference to the accompanying drawings in which.

DETAILED DESCRIPTION OF PREFERRED AND PARTICULAR EMBODIMENTS WITH REFERENCE TO THE DRAWINGS

Figure 1:
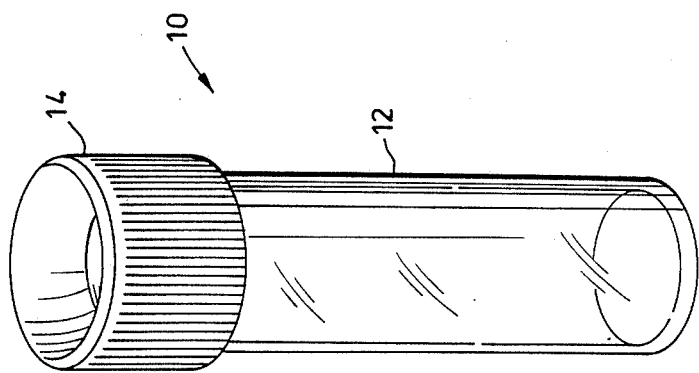
FIG. 1 shows a container for biological fluids in accordance with the invention.

With further reference to FIG. 1 a container 10 for biological fluid samples includes a container body 12 and a lid 14.

Lid 14 is substantially opaque and the interior of container 10 can not be viewed through lid 14.

Container body 12 is amber coloured and semi-transparent or translucent such that the interior of container 10 can be viewed through the walls of container body 12.

Figure 2:
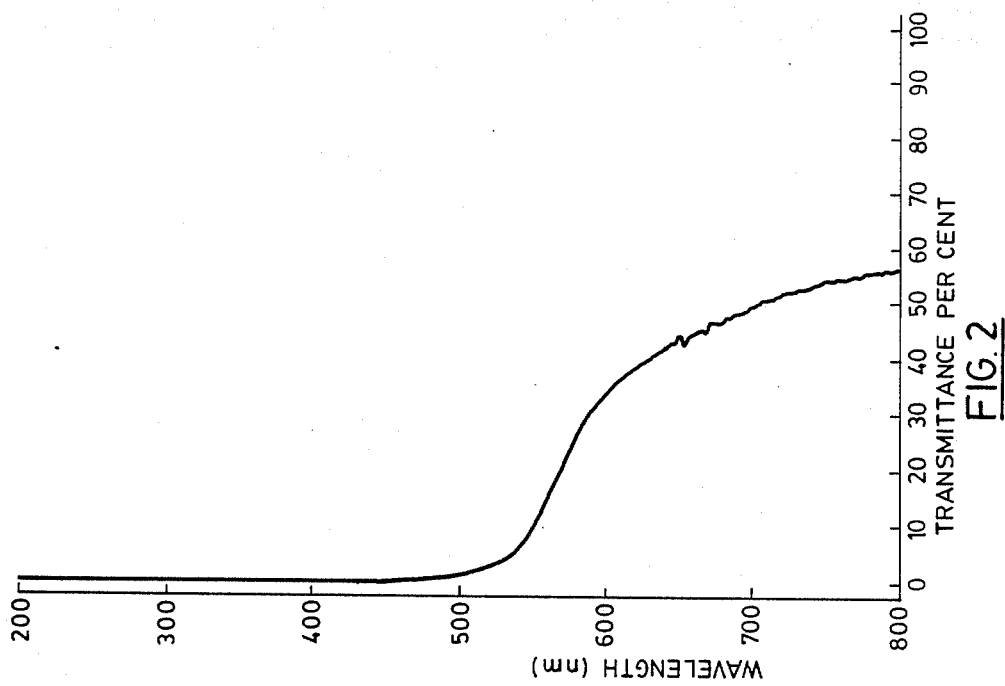
FIG. 2 illustrates graphically the transmission properties of a container body of the invention in a first embodiment.

With further reference to FIG. 2, there is shown graphically a plot of transmission of electromagnetic radiation against wave length in the region 200 to 800 nm for a composition of the invention suitable for forming a body 12 of the invention. It will be observed that there is substantially no transmission of electromagnetic radiation up to 500 nm and transmission only begins to increase at about 550 nm so that transmission is low up to about 600 nm where it is about 0.4. Thereafter transmission increases steadily in the range 600 nm to 800 nm.

Figure 3:
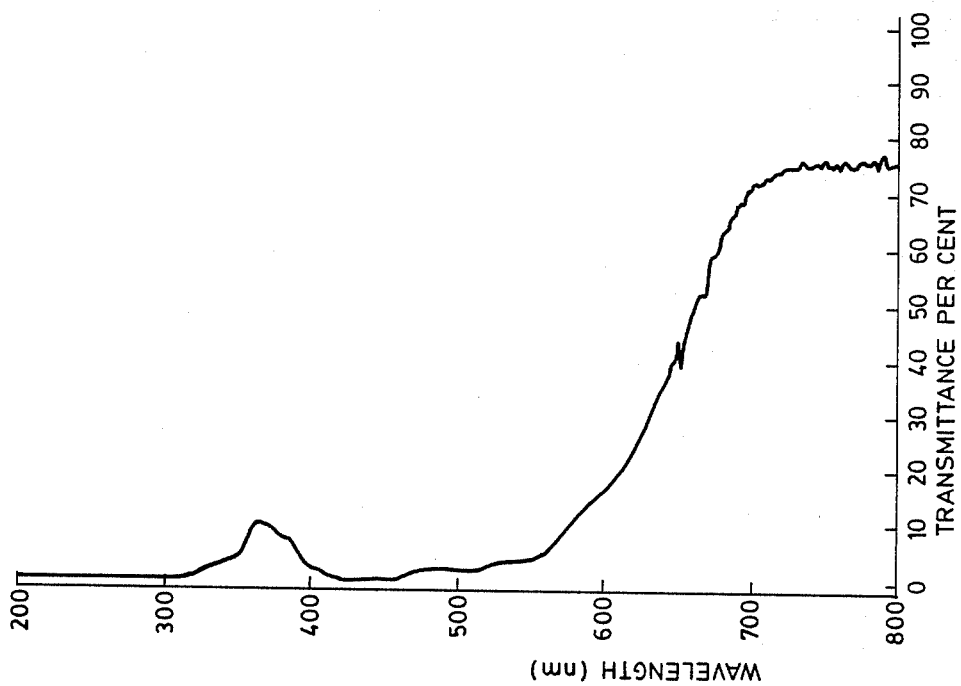
FIG. 3 illustrates graphically the transmission properties of a container body of the invention in a second embodiment.

With further reference to FIG. 3, similar results are shown for a different composition in accordance with the invention. In this case there is no significant increase in transmission until above 600 nm, although there is a small peak showing some increased transmission in a narrow range between 300 and 400 nm.

Figure 4:
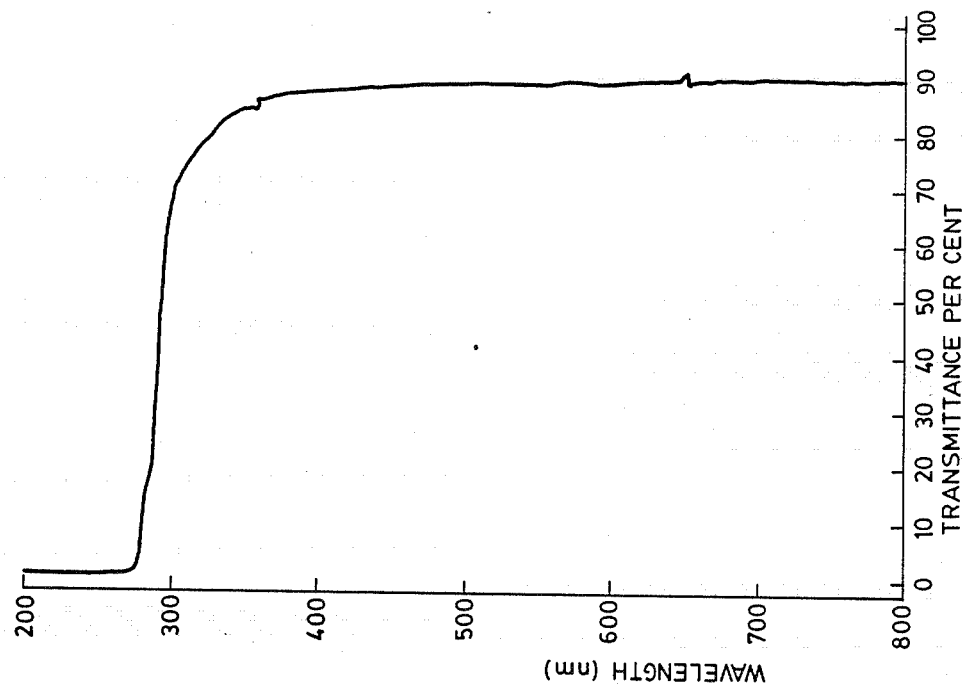
FIG. 4 illustrates graphically the transmission properties of a container body formed from the polymer material of the container bodies of FIGS. 2 and 3 but without the inclusion of colouring matter.

With further reference to FIG. 4 it can be seen that in the absence of colouring matter the polymer material is substantially transparent in a region from below 300 nm to 800 nm.

EXAMPLE

In order to demonstrate the utility of the composition of the invention for storage of photosensitive fluids, light absorption and extraction studies were carried out on compositions in accordance with the invention having the same base polymer material, and a comparison was made with the base polymer material unadulterated with colouring matter.

A. LIGHT ABSORPTION STUDIES (i) Sample Preparation

The samples used for light absorption studies were cut from large batch sheets of molded compositions of the invention in such a way as to give similar thickness, a flat surface with no air bubbles and dimensions of approximately 1×3 cm.

Absorption spectra were recorded on a HP 8451A DIODE ARRAY SPECTROPHOTOMETER in the 200 to 800 nm region.

(ii) Results

TABLE II

| ABSORPTION CHARACTERISTICS OF THE FOUR DIFFERENT MATERIALS (% TRANSMITTANCE) | | | | |
|---|---|---|---|---|
| | Wavelength of Interest (nm) | | | |
| Example | 200-300 | 300-400 | 400-500 | 500-600 |
| 1 | 0 | 0 | 0 | 0-19 |
| 2 | 0 | 0-12 | — | 0-15 |

Example 1 has substantially no transmission up to 500 nm and beyond with a gradual increase of light transmission up to 19% at 600 nm. Example 2 allowed a small amount of light (about 12%) to pass through in a short range between 300-400 nm. Beyond 500 nm, there was a gradual increase of light transmission but the amount of light transmitted was considerably less than for Example 1 in the same region.

A plot of transmission with wave length was obtained for each Example. The results for Example 1 are shown in FIG. 2 and the results for Example 2 are shown in FIG. 3.

The compositions of Examples 1 and 2 are as follows:

Example 1

Base Polymer material: crystal polystyrene (Styron 667), 99.77%, by weight.
Colouring matter: Microspin Red, 0.2%, by weight; Transoxide Black, 0.03%, by weight.

Example 2

Base Polymer material: crystal polystyrene (Styron 667), 99.925%, by weight.
Colouring Matter: Solvent Violet 13 - Solvoperm Blue B, 0.015%, by weight; Solvent Red 135 - Solvoperm Red G, 0.03%, by weight; Disperse Yellow 64 - Solvoperm Yellow G, 0.03%, by weight.

In each case the base polymer was intimately blended with the colouring matter to distribute the colouring matter uniformly therethrough at a temperature of 200° C., and the test sheets were molded from the resulting blend.

FIG. 4 is a comparison showing the results on a test sheet formed from the base polymer material of Examples 1 and 2 but without the addition of colouring matter.

B. EXTRACTION STUDIES (i) Sample Preparation

Sufficient materials from the sheets employed in the light absorption studies were cut into tiny pieces and stored in a vial. 2.00±0.01 g of the pieces were weighed into each of three containers (one 25 ml volumetric flask and two 25 ml clear bottles). Three different liquids were dispensed into each container as follows: 10 ml of 10% ethanol into the 25 ml flask; 5 ml of 0.1N HCl and 5 ml of 0.1N NaOH into the two bottles whereafter the containers were wrapped with parafilm and labelled. The containers were placed onto a heater controlled at a temperature of 50±3° C. for 17 hours. Transmission characteristics of the three solvents in the range 200 nm to 800 nm were recorded and these demonstrated substantially no extraction of colouring matter from the pieces by the liquids. This demonstrates the inert and stable character of the compositions of the invention.

We claim:

1. A container for storage and transportation of photo-sensitive fluids comprising:

a container body formed of polymer material, said polymer material containing colouring matter effective to render said body substantially opaque to electromagnetic radiation having a wavelength of about 200 to about 600 nm and translucent to electromagnetic radiation having a wavelength of about 600 to about 800 nm, said polymer material, when free of said colouring matter, being adapted to form a clear body transparent to electromagnetic radiation having a wavelength of about 200 to about 800 nm.

2. A container according to claim 1, further including a molded lid formed of polymer material containing colouring matter and adapted to be removably secured to close said container body, said colouring matter being effective to render said lid substantially opaque to electromagnetic radiation in the range of about 200 to about 800 nm.

3. A container according to claim 1, wherein said polymer material is crystal polystyrene and said colouring matter is a mixture of at least two inorganic pigments or a mixture of at least two organic pigments effective to colour said crystal polystyrene amber; said polymer material containing from 0.010% to 0.5%, by weight, of said colouring matter.

4. A container according to claim 3, wherein said colouring matter is a blend of micronized red iron oxide and black iron oxide.

5. A container according to claim 3, wherein said colouring matter is a blend of dyes said dyes being polycyclic compounds.

6. A container according to claim 5, wherein said blend is a blend of dyes characterized in accordance with the Colour Index as Solvent Violet 13, Solvent Red 135 and Disperse Yellow 64, in amounts to produce an amber colouration.

7. In a diagnostic method in which a sample of a body fluid is removed from a living body and subsequently subjected to analysis, the improvement wherein immediately upon removal of the sample from the living body, the sample is introduced into a container comprising a container body formed of polymer material, said polymer material containing colouring matter effective to render said body substantially opaque to electromagnetic radiation having a wavelength of about 200 to about 600 nm and translucent to electromagnetic radiation having a wavelength of about 600 to 800 nm, said polymer material, when free of said colouring matter, being adapted to form a clear body transparent to electromagnetic radiation having a wavelength of about 200 to about 800 nm the container is closed and subsequently the analysis of said sample is carried out.

8. A method of storing and transporting photosensitive biological fluid for analysis comprising:

introducing a sample of the fluid to be analysed into a container comprising a container body formed of polymer material, said polymer material containing colouring matter effective to render said body substantially opaque to electromagnetic radiation having a wavelength of about 200 to about 600 nm and translucent to electromagnetic radiation having a wave length of about 600 to 800 nm, said polymer material, when free of said colouring matter, being adapted to form a clear body transparent to electromagnetic radiation having a wavelength of about 200 to about 800 nm, applying a removable closure to said container body to form a closed container, and transferring said closed container to a site for analysis of said sample.

9. A method according to claim 8, wherein the subsequent analysis is carried out at a time several hours after removal of the sample from the living body.

* * * * *